United States Patent [19]

Pellet et al.

[11] Patent Number: 4,687,754

[45] Date of Patent: Aug. 18, 1987

[54] CATALYTIC CRACKING CATALYSTS AND PROCESS

[75] Inventors: Regis J. Pellet, Croton-On-Hudson; Donald F. Best, Mahopac; Gary N. Long, Putnam Valley; Jule A. Rabo, Armonk; Edward T. Wolynic, Scarsdale, all of N.Y.

[73] Assignee: Union Carbide Corporation, Danbury, Conn.

[21] Appl. No.: 657,417

[22] Filed: Oct. 3, 1984

Related U.S. Application Data

[63] Continuation-in-part of Ser. No. 490,965, May 2, 1983, abandoned.

[51] Int. Cl.$^4$ .............................................. B01J 29/06
[52] U.S. Cl. ........................................ 502/65; 502/73
[58] Field of Search ..................................... 502/65, 73

[56] References Cited

U.S. PATENT DOCUMENTS 4,503,023  3/1985  Breck .................................. 423/328

Primary Examiner—Carl F. Dees
Attorney, Agent, or Firm—Vincent J. Vasta, Jr.

[57] ABSTRACT

Catalytic cracking catalysts, the process of their preparation and the process of their use. The cracking catalyst comprises a zeolite having a mole ratio of oxides in the dehydrated state of (0.85-1.1) $M_{2/n}O:Al_2O_3:xSiO_2$ wherein "M" is a cation having a valence of "n", "x" has a value greater than 6.0, has a x-ray powder diffraction pattern having at least the d-spacings of Table A, has extraneous silicon atoms in the crystal lattice in the form of framework $SiO_4$ tetrahedra and has been thermally treated and/or cation exchanged with a multivalent cation. The catalyst of the instant invention are unique in the fact that the zeolitic aluminosilicate has less than 1.2 weight percent $Na_2O$ and such is achieved without the requirement of a pre-calcination step.

21 Claims, No Drawings

CATALYTIC CRACKING CATALYSTS AND PROCESS

CROSS REFERENCE TO RELATED APPLICATION

This application is a continuation in part application of U.S. Ser. No. 490,965, filed May 2, 1983 now abandoned.

FIELD OF THE INVENTION

The present invention relates to cracking catalysts derived from novel zeolitic aluminosilicates described in copending U.S. Ser. No. 315,853, filed Oct. 28, 1981 (U.S. Pat. No. 4,503,023) and to the process of their use. The catalysts of the invention provide improvement in gasoline selectivity and coke selectivity as compared to catalysts containing Y zeolites.

BACKGROUND OF THE INVENTION

The prior art dealing with catalytic cracking catalysts is voluminous with a basic goal being the preparation of modified zeolites for use as cracking catalysts. The following patents are representative of the prior art.

The use of conversion catalysts formed from a zeolite dispersed in a siliceous matrix has been disclosed in U.S. Pat. No. 3,140,249 and U.S. Pat. No. 3,352,796.

The use of blended matrix components, e.g., a catalyst comprising a zeolite, an inorganic oxide matrix and inert fines, which may be alpha alumina, is disclosed in U.S. Pat. No. 3,312,615. Catalysts comprising an amorphous silica-alumina, separately added alumina and a zeolite are disclosed in U.S. Pat. No. 3,542,670 and catalyst comprising a zeolite, an amorphous hydrous alumina and alumina monohydrate are disclosed in U.S. Pat. No. 3,428,550.

It has been disclosed that the steam and thermal stability of zeolites can be improved by the use of zeolites having a low level of alkali metal content and a unit cell size less than about 24.45 Angstroms (See: U.S. Pat. Nos. 3,293,192 and Re. 28,629 (Reissue of U.S. Pat. No. 3,402,996)).

Further, it has been disclosed (U.S. Pat. No. 3,591,488) that the hydrogen or ammonium form of a zeolite may be treated with steam at a temperature ranging from about 800° to about 1500° F., and then subsequently cation exchanging the steam treated zeolite with cations which may be rare earth metal cations. The method increases the silica to alumina mole ratio of the zeolite crystal framework lattice and also crystal structure imperfections. U.S. Pat. No. 3,676,368 discloses a rare earth exchanged-hydrogen faujasite containing from 6 to 14 percent rare earth oxides. U.S. Pat. No. 3,957,623 discloses a rare earth exchanged zeolite having a total of 1 to 10 weight percent rare earth metal oxide. U.S. Pat. No. 3,607,043 discloses a process for preparing a zeolite having a rare earth content of 0.3 to 10 weight percent.

U.S. Pat. No. 4,036,739 discloses hydrothermally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

A catalyst for the formation of high octane gasoline products and its use in cracking processes is disclosed in copending U.S. Ser. No. 657,482 filed 10/3/84. The catalysts of such copending application employ specific LZ-210 zeolites and have a critical effective amount of rare earth cations and a low $Na_2O$ content, respectively, of from greater than zero to less than 5 percent by weight rare earth and less than 1.2 weight percent $Na_2O$, such being based on the weight of the LZ-210 component in the catalyst.

SUMMARY OF THE INVENTION

The instant invention relates to the process for the catalytic cracking of a crude oil feedstock to produce lower boiling hydrocarbons which comprises contacting said feedstock with a zeolitic aluminosilicate which is characterized by its achievement of a low amount of $Na_2O$ without the heretofore costly requirement of a pre-calcination step. The zeolitic aluminosilicates employed herein have a mole ratio of oxide in the dehydrated state of $$(0.85-1.1)M_{2/n}O:Al_2O_3:x\ SiO_2$$

wherein M is a cation having a valence of "n"; x has a value greater than 6; having a X-ray powder diffraction pattern having at least the d-spacings of Table A; having extraneous silicon atoms in the crystal lattice in the form of framework $SiO_4$ tetrahedra; and wherein said aluminosilicate has been heated at an effective temperature and for an effective time in the presence of an effective amount of steam and/or has been ion-exchanged with at least one multivalent cation, as hereinafter described. The zeolitic aluminosilicates employed in the instant process are unique in the fact that catalysts with less than 1.2 wt percent $Na_2O$, based on the zeolitic aluminosilicate, can be achieved without the use of costly calcination steps to remove $Na_2O$ associated with the zeolitic aluminosilicate.

The invention provides for cracking processes wherein a higher gasoline yield and improved coke selectivity are achieved as compared with cracking catalyst containing Y zeolites.

DETAILED DESCRIPTION OF THE INVENTION

The present invention relates to new catalytic cracking catalysts having low $Na_2O$ contents, their method of preparation and to the process of their use in catalytic cracking processes to provide a process exhibiting improved gasoline yield and coke selectivity. The catalytic cracking catalysts of the instant invention are derived from a novel class of zeolitic aluminosilicates denominated LZ-210 in copending U.S. Ser. No. 315,853, filed Oct. 28, 1981, said application being incorporated herein by reference thereto.

It has been discovered that LZ-210 may be treated, e.g., hydrothermal treatment and/or ion-exchange with a multivalent cation, preferably rare earth cations, to give catalytic cracking catalysts which have improved catalytic activity selectivity to gasoline products and a reduction in the amount of coke formation, i.e., an improvement in coke selectivity. The cracking catalysts comprising LZ-210 are surprising in several respects. Firstly, a substantial body of technical information in the patent and other literature discloses that certain multivalent cations, e.g., rare earth cations, have a predictable affect on the products obtained by use of a catalyst in a cracking process. The catalysts of the instant invention demonstrate that these heretofore predictable affects are not similarly relatable to cracking catalysts derived from LZ-210. The significant improvements obtained by use of the catalysts of this invention are synergistic in nature as compared to the results obtained with Y zeolites. Secondly, the catalysts of the instant invention demonstrate surprising differences over conventional cracking catalysts that contain Y zeolite. Characteristic of such differences is the ability to achieve a catalyst having a low Na$_2$O content without the use of the costly calcination step heretofore required for cracking catalysts derived from Y zeolites. This surprising difference in the Na$_2$O content of similarly treated zeolites has not been observed heretofore for zeolites having the X-ray pattern of zeolite Y. This difference is of significant economic importance in the preparation of cracking catalysts.

The catalysts of the present invention will be referred to herein, solely for the purpose of reference herein, as (1) LZ-210-T and (2) LZ-210-M to denominate, respectively (1) a LZ-210 catalyst which has been subjected to a thermal treatment, including a hydrothermal treatment, and (2) an LZ-210 catalyst which has been subjected to a treatment with a multivalent cation and, optionally, thermal treatment. Other components may be provided with LZ-210-T and LZ-210-M to provide the final catalytic cracking catalyst and examples of such other components will be discussed hereinafter.

LZ-210-T and LZ-210-M are prepared using LZ-210 as described in U.S. Ser. No. 315,853, above mentioned with a general description of LZ-210 being as follows:

DESCRIPTION OF ZEOLITE LZ-210

Aluminosilicates having in the dehydrated state, a chemical composition expressed in terms of mole ratios of oxides as (0.85–1.1) M$_{2/n}$O:Al$_2$O$_3$:x SiO$_2$ wherein "M" is a cation having the valence "n"; and "x" has a value greater than 6; having an X-ray powder diffraction pattern having at least the d-spacings set forth in Table A, below; and having extraneous silicon atoms in its crystal lattice in the form of SiO$_4$ tetrahedra, preferably in an average amount of at least 1.0 per 10,000Å$^3$.

For purposes of reference herein the framework composition is best expressed in terms of mole fractions of framework tetrahedra TO$_2$. The starting zeolite may be expressed as:

(Al$_a$Si$_b$□$_z$)O$_2$ wherein "a" is the mole fraction of aluminum tetrahedra in the framework; "b" is the mole fraction of silicon tetrahedra in the framework; □ denotes defect sites and "a" is the mole fraction of defect sites in the zeolite framework. In many cases the "z" value for the starting zeolite is zero and the defect sites are simply eliminated from the expression. Numerically the sum of the values a+b+z=1.

The zeolite product of the fluorosilicate treatment, expressed in terms of mole fraction of framework tetrahedra (TO$_2$) will have the form

[Al$_{(a-N)}$Si$_{b+(N-\Delta z)}$□$_z$]O$_2$

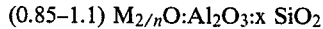

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; (N−Δz) is the mole fraction increase in silicon tetrahedra resulting from the fluorosilicate treatment; "Δz" is the net change in the mole fraction of defect sites in the zeolie framework resulting from the treatment; and Δz×z (product zeolite)−z (starting zeolite). The term "Defect Structure Factor" for any given zeolite is equivalent to the "z" value of the zeolite and is further discussed hereinafter. The net change in Defect Structure Factors between the starting zeolite and the product zeolite is equivalent to "Δz". Numerically, the sum of the values:

$(a - N) + [b + (N - \Delta z)] + z = 1$

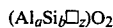

A subclass of the above LZ-210 compositions, i.e., those which are characterized by having both high molar SiO$_2$/Al$_2$O$_3$ ratios and low Defect Structure Factors (as hereinafter discussed), can be defined as having a chemical composition expressed in terms of mole fractions of framework tetrahedra as:

[Al$_{(a-N)}$Si$_{b+(N-\Delta z)}$□$_z$]O$_2$ wherein: the mole fraction of aluminum removed from the framework of the starting zeolite is "N";

$$\frac{b + (N - \Delta z)}{a - N}$$

has a value greater than 6; the change in defect structure factor Δz is less than 0.08 and preferably less than 0.05; an increased silicon content in the framework, (N−Δz)/N, of at least 0.5; and a cation equivalent expressed as a monovalent cation species, M+/Al, from 0.85 to 1.1 and the characteristic crystal structure of zeolite Y as indicated by an X-ray powder diffraction pattern having at least the d-spacings set forth broadly in Table A.

TABLE A

| d (Å) | Intensity |
|---|---|
| 14.22–13.97 | very strong |
| 8.71–8.55 | medium |
| 7.43–7.30 | medium |
| 5.66–5.55 | strong |
| 4.75–4.66 | medium |
| 4.36–4.28 | medium |
| 3.75–3.69 | strong |
| 3.30–3.23 | strong |
| 2.85–2.79 | strong |

Zeolite LZ-210 as defined above will have cubic unit cell dimension, a$_o$, of less than 24.61 Angstroms, preferably from 24.20 to 24.61 Angstroms and an adsorption capacity for water vapor at 25° C. and 4.6 Torr water vapor pressure of at least 20 weight percent based on the anhydrous weight of the zeolite, and preferably an oxygen adsorption capacity at 100 Torr and −183° C. of at least 25 weight percent.

LZ-210 can be prepared by a method which removes framework aluminum from a zeolite having SiO$_2$/Al$_2$O$_3$ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in copending U.S. Ser. No. 315,853 comprises contacting a crystalline zeolite having pore diameters of at least about 3 Angstroms and having a molar $SiO_2/Al_2O_3$ ratio of at least 3, with a fluorosilicate salt, preferably in an amount of at least 0.0075 moles per 100 grams of zeolite starting material, said fluorosilicate salt being in the form of an aqueous solution having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar $SiO_2/Al_2O_3$ ratio of less than 6 by using the above process to increase the $SiO_2/Al_2O_3$ ratio to a value greater than 6. A preferred procedure comprises:

(a) providing a zeolite Y composition having a molar $SiO_2/Al_2O_3$ ratio less than that of the final product;

(b) contacting and reacting at a temperature of from 20° to 95° C., said zeolite Y with a fluorosilicate, preferably ammonium fluorosilicate. The fluorosilicate solution, being in the form of an aqueous solution at a pH in the range of 5 to about 7, is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y composition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly it is preferred that the $SiO_2/Al_2O_3$ ratio of the starting zeolite be at least 3.0. Also it is preferred that at least about 50, more preferably at least 95%, of the $AlO_4^-$ tetrahedra of the naturally occurring or as-synthesized zeolite are present in the starting zeolite. Most advantageously the starting zeolite contains as many as possible of its original $AlO_4^-$ tetrahedra, i.e., has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations form the most soluble salt in this regard and it is accordingly preferred that at least 50 percent, more preferably 85 or more percent, of the zeolite cations be ammonium cations. Sodium and potassium, two of the most common original cations in zeolites are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula (A)$_{2/b}$SiF$_6$ wherein A is preferably a metallic or non-metallic cation other than H$^+$ having the valence "b". Cations represented by "A" are alkylammonium, NH$_4^+$, H$^+$, Mg$^{++}$, Li$^+$, Na$^+$, K$^+$, Ba$^{++}$, Cd$^{++}$, Cu$^+$, Cu$^{++}$, Ca$^{++}$, Cs$^+$, Fe$^{++}$, Co$^{++}$, Pb$^{++}$, Mn$^{++}$, Rb$^+$, Ag$^+$, Sr$^{++}$, Tl$^+$ and Zn$^{++}$. The ammonium cation form of the fluorosilicate is highly preferred because of its substantial solubility in water and also because the ammonium cations form water soluble by-product salts upon reaction with the zeolite, namely (NH$_4$)$_3$AlF$_6$.

In certain respects, the manner in which the fluorosilicate and starting zeolite are brought into contact and the overall process of substituting silicon for aluminum in the zeolite framework is a two step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

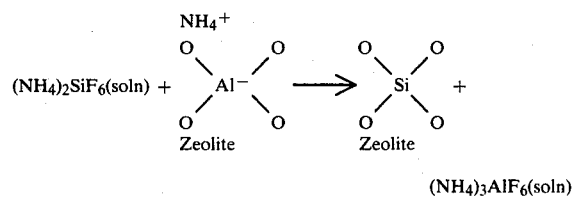

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also, increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid undue destructive acidic attack on the zeolite structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations shoould be optimized with respect to each zeolite starting material. In general the more highly siliceous the zeolite, the higher the permissible reaction temperature and the lower the suitable pH conditions. In general the preferred reaction temperature is within the range of 50° to 95° C., but temperatures as high as 125° C. and as low as 20° C. have been suitably employed in some instances. At pH values below about 3, crystal degradation is generally found to be unduly severe, whereas at pH values higher than 7, silicon insertion is unduly slow. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent, the undissolved solids being readily available to replace dissolved molecular species consumed in reaction with the zeolite. As stated hereinabove, the amount of dissolved fluorosilicates employed with respect to the particular zeollite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

In this disclosure, including the appended claims, in specifying proportions of zeolite starting material or adsorption properties of the zeolite product, and the like, the anhydrous state of the zeolite will be intended unless otherwise stated. The dehydrated state is considered to be that obtained by heating the zeolite in dry air at 100° C. for about 1 to 2 hours.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 80 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T) as described in J. Am. Chem. Soc. 60 309 (1938) using nitrogen as the adsorbate. In determining the adsorption capacity, the capacity for oxygen at $-183°$ C. at 100 Torr is preferred.

All available evidence, to date, indicates that the above described process is unique in being able to produce zeolites essentially free of defect structure yet having molar $SiO_2/Al_2O_3$ ratios higher than those heretofore obtained by direct hydrothermal synthesis, i.e., no other process is known to date for preparing LZ-210. The products resulting from the operation of the process share the common characteristic of having a higher molar $SiO_2/Al_2O_3$ ratio than previously obtained for each species by direct hydrothermal synthesis by virtue of containing silicon from an extraneous, i.e., non-zeolitic, source, preferably in conjunction with a crystal structure which is characterized as containing a low level of tetrahedral defect sites. This defect structure, if present, is revealed by the infrared spectrum of zeolites in the hydroxyl-stretching region.

In untreated, i.e., naturally occurring or as-synthesized zeolites the original tetrahedral structure is conventionally represented as

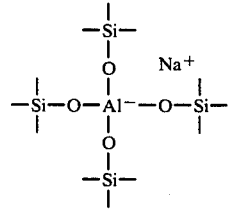

After treatment with a complexing agent such as ethylene-diaminetetraacetic acid (H₄EDTA) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

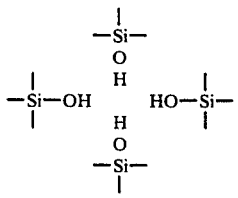

The infrared spectrum of the aluminum depleted zeolite will show a broad nondescript absorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interfering hydroxyl groups and thus be able to observe the absorption attributable to the "nest" hydroxyls only. The hydroxyls belonging to adsorbed water were avoided by subjected the hydrated zeolite sample to vacuum activation at a moderate temperature of about 200° C. for about 1 hour. This treatment permits desorption and removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It has been found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si—OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacanices or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counterparts and also with equally siliceous prior known counterparts prepared by other techniques.

DEFECT STRUCTURE FACTOR (A) Defect Structure Zeolite Standard

Standards with known amounts of defect structure can be prepared by treating a crystalline zeolite of the same species as the product sample with ethylenediametetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples, can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Samples and Defect Structure Zeolite Standard

Fifteen milligrams of the hydrated zeolite to be analyzed are pressed into a 13 mm. diameter self-supporting wafer in a KBr die under 5000 pounds per square inch (psi) pressure. The wafer is then heated at 200° C. for 1 hour at a pressure of not greater than $1 \times 10^{-4}$ mm. Hg to remove all observable traces of physically adsorbed water from the zeolite. This condition of the zeolite is evidenced by the total absence of an infrared absorption band at 1640 cm$^{-1}$. Thereafter, and without contact with adsorbable substances, particularly water vapor, the infrared spectrum of the wafer is obtained on an interferometer system at 4 cm$^{-1}$ resolution over the frequency range of 3745 to 3000 cm$^{-1}$. Both the product sample and the standard sample are analyzed using the same interferometer system to avoid discrepancies in the analysis due to different apparatus. The spectrum, normally obtained in the transmission mode of operation, is mathematically converted to and plotted as wave number vs. absorbance.

(C) Determination of the Defect Structure Factor

The defect structure factor (z) is calculated by substituting the appropriate data into the following formula:

$$z = \frac{AA_{(ps)} \times \text{(Mole fraction of defects in the standard)}}{AA_{(std)}}$$

wherein $AA_{(ps)}$ is the infrared absolute absorbance measured above the estimated background of the product sample at 3710 cm$^{-1}$; $AA_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from wet chemical analysis of the product sample for $SiO_2$, $Al_2O_3$ and the cation content as $M_{2/n}O$ whether silicon has been substituted for aluminum in the zeolite as a result of the treatment and also the efficiency of any such silicon substitution.

The fact that the present process results in zeolite products haviing silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased $SiO_2/Al_2O_3$ molar ratio.

The essential X-ray powder diffraction patterns appearing in this specification and referred to in the appended claims are obtained using standard X-ray powder diffraction techniques. The radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where 2 theta is the Bragg angle as observed on the strip chart. Intensities are determined from the heights of diffraction peaks after subtracting background.

In determining the cation equivalency, i.e., the molar ratio $M_{2/n}O/Al_2O_3$ in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each $AlO_4^-$ tetrahedron or whether some of the positive valence of the cation is used in bonding with $OH^-$ or $H_3O^+$ ions.

The preferred novel crystalline aluminosilicate compositions of the present invention will contain a chemical or molar framework composition which can be determined from the expression of mole fractions of framework tetrahedra previously described:

$$[Al_{(a-N)}Si_{b+(N-\Delta z)}\square_z]O_2$$

wherein: the framework Si/Al ratio is determined by $$\frac{b + (N - \Delta z)}{a - N}$$

and is numerically greater than 3, the mole fraction of silicon tetrahedra substituted into the framework of the product zeolite $(N-\Delta z)$ is increased by at least a value for $(N-\Delta z)/N$ which is numerically equal to or greater than 0.5, the change in Defect Structure Factor $\Delta z$ is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

CATALYSTS LZ-210-T and LZ-210-M

The catalysts of the instant invention are prepared by the treatment of LZ-210 having a $SiO_2$ to $Al_2O_3$ ratio of greater than 6.0, and, depending on the exact nature of the catalytic cracking process, e.g., cracking of resids, preferably greater than 8.0. For a conventional cracking process the preferred $SiO_2$ to $Al_2O_3$ range is greater than 6.0 and less than about 11.0 and in some instances it may be preferable to have $SiO_2$ to $Al_2O_3$ ratios greater than 6.0 and less than 9.0. In most instances the $SiO_2/Al_2O_3$ ratio of the zeolitic aluminosilicate is correlated to the catalyst activity and to the regeneration step to effect a process with improved equilibrium catalyst activity and gasoline yield.

The catalysts of this invention provide a new dimension to catalytic cracking catalysts as demonstrated by the achievement of cracking catalysts having less than 1.2 weight percent $Na_2O$, often less than 0.8 weight percent $Na_2O$, based on the weight of the zeolitic aluminosilicate employed in the cracking catalyst. The fact that such amounts of $Na_2O$ can be attained without a $Na_2O$ calcination and with a commercially acceptable number of ion exchanges demonstrates the significant differences between catalysts containing LZ-210-M and/or LZ-210-T as compared to catalysts containing Y zeolite. It is well known in the patent and other literature that cracking catalysts containing Y zeolite must be calcined prior to ion exchange if an acceptable amount of $Na_2O$ is to be present after ion exchange of the catalyst has been carried out with ammonium and/or multivalent cations. The catalysts of the instant invention do not require the use of this precalcination step and demonstrates a fundamental differences in such catalysts and catalysts containing Y zeolite.

In this disclosure the term "$Na_2O$ calcination" is meant to denominate a thermal treatment of an aluminosilicate (alone or in combination with the inorganic oxide matrix) at an effective temperature to effect a thermal redistribution of cations, e.g., alkali metal cations, associated with the aluminosilicate to promote the removal of such by ion exchange. The term "$Na_2O$ calcination" is generally understood by those skilled in the art of zeolites to include treatments at temperatures of 300° C. or greater for about 1 hour, since at such a temperature and for such a period of time at least some redistribution of the cations associated with the aluminosilicate is effected. For example, in the commercial preparation of catalytic cracking catalysts the aluminosilicate is calcined at a temperature of 500° C. or greater to redistribute $Na_2O$ and facilitate ion-exchange of sodium ions in a post-calcination ion exchange. Processes, such as spray drying, which are carried out at temperatures of about 200° C. for a period of 5 seconds or less are not considered to come within the scope of the term "Na$_2$O calcination", since such processes are not carried out to remove cations associated with the aluminosilicate. Further, a thermal treatment step not followed by a cation exchange, e.g., ammonium ion or rare earth cation exchange, is not a "Na$_2$O calcination" within the meaning of this invention, since such has not been carried out to effect the removal of cations, e.g., sodium or other alkali cations, associated with the aluminosilicate, and as a result facilitate by thermal means an increase in the ease of ion exchange of such cations. Although a thermal calcination is not required to achieve catalysts having low Na$_2$O contents, it is clear that the treatment of aluminosilicate may provide other beneficial results when such calcinations are carried out on the finished catalyst and, accordingly, such optional calcinations are not excluded from the scope of the instant invention.

The term "thermal treatment" is employed generally herein to denominate both a thermal calcination and a hydrothermal calcination (thermal calcination in the presence of steam). A thermal treatment is carried out at an effective temperature and for an effective time, and when a hydrothermal treatment, in the presence of an effective amount of steam, to provide an LZ-210 derived catalyst of the instant invention, referred to herein as LZ-210-T. A thermal treatment is typically carried out at a temperature in excess of 300° C. for a period in excess of 0.25 hours and when the thermal treatment is a hydrothermal treatment it is typically carried out in the presence of at least about 20 percent steam by volume in air. The source of the steam is not important and may be provided from an external source or may be generated in situ at the temperatures employed for the hydrothermal treatment.

LZ-210-M is prepared by ion-exchange or impregnation of LZ-210, which, optionally, has been subjected to thermal treatment, by contacting the LZ-210 with a solution of at least one multi-valent cation selected from the group consisting of cations of Group IIA, and rare earth cations selected from the group consisting of cerium, lanthanum, praseodymium, neodymiumm, promethium, samarium, europium, gadolinium, terbium, dysprosium, holmium, erbium, thulium, ytterbium, lutetium and mixtures thereof. As a result of ion-exchange of the LZ-210 (or LZ-210-M), at least one multivalent cation, e.g., rare earth cation, is ion-exchanged with the cations initially present in LZ-210. When the multivalent cation(s) comprises at least one rare earth cation, the designation "LZ-210-RE" is employed to indicate that the original cations have been replaced at least in part by rare earth (RE) cations. The multivalent cation is preferably present in an effective amount that removes at least about 2 ion exchange percent of the cations present in the starting LZ-210 material and is typically present in an effective amount greater than about 5.0 ion exchange percent and preferably between about 16 ion exchange percent and about 80 ion exchange percent.

The ion exchange percent for a zeolite LZ-210 is related to the SiO$_2$ to Al$_2$O$_3$ ratio for the LZ-210, since as the SiO$_2$ to Al$_2$O$_3$ ratio of LZ-210 zeolites increases the total number of cation exchange sites generally decreases. Accordingly, the weight percent of multivalent cations present for two LZ-210 zeolites having the same ion exchange percent of multivalent cations but having different SiO$_2$ to Al$_2$O$_3$ ratios will be different with the LZ-210 zeolite having the lower SiO$_2$ to Al$_2$O$_3$ ratio having the higher weight percent of multivalent cations as a result of the larger total number of cation sites. For example, if the two LZ-210 zeolites of examples 3 and 16, discussed hereinafter, having SiO$_2$ to Al$_2$O$_3$ ratios of 6.5 and 9.0 are cation exchanged to 100 ion exchange percent with rare earth cations having a cation charge of +3 the weight percent rare earth cation for each LZ-210 zeolite, based on the total weight of the zeolite and rare earth cations, would be 20.5 percent and 14.7 percent by weight, respectively.

The catalysts referred to herein are prepared from LZ-210 zeolites having a silica to alumina ratio of greater than 6, preferably greater than 6 to about 11, more preferably greater than 6 to about 9 and most preferably between about 6 and about 8. When the hydrocarbon feedstock to be cracked is a resid or a feed stock containing at least about 10 weight percent resid, the silica to alumina ratio is preferably above 8.0 when the regenerator is operated at higher temperatures to facilitate the burn-off of the increased amount of coke formed by the presence of the resid. For a conventional cracking process employing a hydrocarbon feed boiling between about 420° F. and about 1100° F. the regenerator conditions are such that it is preferred to use an LD-210-T or LZ210-M having a SiO$_2$/Al$_2$O$_3$ ratio greater than 6.0 and less than 9.0, preferably less than 8.0. The SiO$_2$ to Al$_2$O$_3$ ratio may be correlated to the processing and/or to catalyst regeneration conditions. The preparation of LZ-210-T and LZ-210-M can involve several steps including multivalent cation exchange, thermal and/or hydrothermal treatment and other optional treatments such as ammonium ion exchange. The various processing steps employed to prepare a given catalyst are denominated herein by a shorthand notation where the following notations have the following general meanings:

(i) = thermal treatment at effective conditions; and (ii) = LZ-210 has been exchanged with a multivalent cation; and optionally, the LZ-210 can be ion exchanged with ammonium cations.

The above process steps can be employed in a sequential manner to set forth the processing sequences employed for a given catalyst and may be employed in any order for one or more times. For example, the designation "(i), (ii)" means that the LZ-210 material has been sequentially thermally treated and then ion exchanged with at least one multivalent cation.

The process for the preparation of LZ-210-T and LZ-210-M generally comprises treatment of a zeolite aluminosilicate which has a mole ratio of oxides in the dehydrated state of (0.85–1.1) M$_{2/n}$O:Al$_2$O$_3$; x SiO$_2$ wherein M is a cation having a valence of "n" and "x" has a value greater than 6.0, has an x-ray powder diffraction pattern having at least the d-spacings of Table A and having extraneous silicon atoms in the crystal lattice in the form of framework SiO$_4$ tetrahedra by employing at least one of the following steps of:

(i) treating the aluminosilicate at an effective temperature for an effective time; and (ii) providing an effective amount of at least one Group IIA metal or rare-earth cation selected from the class consisting of cerium, lanthanum, praseodymium, neodymium, promethium, samarium, europium, gadolinium, terbium, dysprosium, holmium, erbium, thulium, ytterbium, lutetium and mixtures thereof.

It is understood that in addition to steps (i) and (ii) that combinations of steps (i) and (ii) for one or more times in any order are within the scope of this invention.

In addition to the above, the aluminosilicate may be ammonium exchanged either before or after either of steps (i) or (ii). The ion exchange step(s) (either ammonium or multivalent cation) is generally carried out by preparing a slurry of LZ-210 or LZ-210-T zeolite by adding about 5 to 15 volumes of water per volume of catalyst, after which a solution of a rare earth salt is added. The ion exchange is generally carried out at room temperature and the resulting solution is then heated to above about 50° C. and stirred at this temperature for a time for minutes to hours, e.g., from 1 minute to about 3 hours. This mixture is then filtered and water washed to remove excess anion present as a result of the solution of the ammonium or multivalent cation salt.

The ammonium ion exchange step is preferably carried out by slurrying zeolite LZ-210 with between 5 to 15 volumes of water per volume of catalyst after which an ammonium salt is added to the slurry. The resulting mixture is typically heated to a temperature above about 50° C. for a period between minutes to hours, e.g., 1 minute to 3 hours. The mixture is filtered and water washed until excess anion from the ammonium salt is removed. The ammonium ion exchange process is typically repeated one or more times according to the above described procedure.

The final cracking catalysts containing LZ-210-T and LZ-210-M are typically employed with an inorganic oxide matrix component which may be any of the inorganic matrices (and binders) which have heretofore been employed in formulating FCC catalysts including: amorphous catalytic inorganic oxides, clays, silicas, aluminas, silica-aluminas, silica-zirconia, silica-magnesia, alumina-boria, alumina-titania, the like and mixtures thereof. The use of a matrix comprising a kaolin clay and a silica or alumina binder has heretofore been employed in conventional cracking catalysts and are employable herein. The matrix may be in the form of a sol, hydrogen or gel and is typically an alumina or silica-alumina component such as those heretofore employed in conventional cracking catalyst, several types and compositions of which are commercially available. The matrix may itself provide a catalytic effect or it may be essentially inert. The matrix may act as the "binder" in some instances, but in most instances the final catalyst will be spray dried or formed with the use of a binder such as a silica or alumina. Silicas and aluminas may be prepared as gels of silica and/or alumina or as alumina precipitated on a preformed and preaged hydrogel. Silicas may be present as major or minor components in the solids present in said gels, e.g., present in an amount between about 55 and about 99 weight percent and preferably between about 70 and about 90 weight percent. The silica may also be employed in the form of a cogel comprising about 75 weight percent silica and about 25 weight percent alumina or comprising about 87 weight percent silica and about 13 weight percent alumina. The inorganic oxide matrix component will typically be present in the catalyst in an amount between about 10 and about 99 weight percent, preferably between about 50 and about 90 weight precent, based on the total catalyst. It is also within the scope of the instant invention to employ other materals with the LZ-210-T and LZ210-M in the final cracking catalysts, including various other types of zeolites, clays, carbon monoxide oxidation promoters, etc.

As above mentioned, the catalysts of the present invention may be employed with an alumina matrix component. The alumina component may comprise discrete particles of various aluminas, preferably crystalline aluminas. The alumina component may be in the form of discrete particles having a total surface area, as measured by the method of Brunauer, Emmett and Teller (BET), greater than about 20 square meters per gram ($M^2/g$), preferably greater than 145 $M^2/g$, for example, from about 145 to about 300 $M^2/g$. The pore volume of the alumina component is typically greater than 0.35 cc/g. The average particle size of the alumina particles is generally less than 10 microns and preferably less than 3 microns. The alumina may be employed alone as the matrix or composited with the other matrix components having inherently less catalytic cracking activity than the alumina matrix component. The alumina component may be any alumina and has preferably been preformed and placed in a physical form such that its surface area and pore structure are stabilized so that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina is typically an alumina which has been formed by suitable chemical reaction, the slurry aged, filtered, dried, washed free of residual salt and then heated to reduce its volatile content to less than about 15 weight percent. The alumina component may be present in the final catalyst in an amount ranging between about 5 and about 95 weight percent, preferably between about 10 and about 30 weight percent based on the total catalyst. Further, an alumina hydrosol or hydrogel or hydrous alumina slurry may be used in the catalyst preparation.

Mixtures of LZ-210-T and/or LZ-210-M and an inorganic matrix are typically formed into a final form for the catalyst by standard catalyst forming techniques including spray-drying, pelleting, extrusion and other suitable conventional means. Such catalysts are generally prepared by a spray drying procedure and such procedures are well known to those skilled in the art. Alternatively, extruded products may be dried in air and then, further dried in an air purge at a programmed temperature increase. These products may then be crushed and sized to the desired particle size, e.g., less than 150 microns.

Catalytic cracking catalysts may also be prepared by any one of several other conventional methods. Another method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and the reslurried in water. The alumina may be prepared by reacting solutions of sodium aluminate and aluminum sulfate under suitable conditions, aging the slurry to give the desired pore properties of the alumina, filtering, drying, reslurrying in water to remove sodium and sulfate ions and drying to reduce volatile matter content to less than 15 weight percent. The alumina may then be slurried in water and blended in proper amounts, with a slurry of impure silica-alumina hydrogel. The LZ-210-T and/or LZ-210-

M component may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically recovered after calcination.

Catalytic cracking with the catalysts of the present invention can be conducted in any conventional catalytic cracking manner. Suitable catalytic cracking conditions include a temperature ranging from about 400° F. to about 1300° F. and a pressure ranging from about subatmospheric to several atmospheres, typically from about atmospheric to about 100 psig. The process may be carried out in a fixed bed, moving bed, ebullating bed, slurry, transferline, riser reactor or fluidized bed operation. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the gas oil range, that is, hydrocarbon oils having an atmospheric pressure boiling point ranging from about 420° to about 1100° F. to naphthas to yield products having a lower boiling point than the initial feed. The instant invention is unique in several aspects. It has been observed that when such catalysts are compared to similarly treated Y zeolites that: the instant catalysts give improved selectivity to gasoline products, especially for $SiO_2$ to $Al_2O_3$ ratios greater than 6.0 and less than about 8.0; give catalysts having higher activity as indicated by higher conversions; provide a reduction in coke formation, especially with increasing $SiO_2$ to $Al_2O_3$ ratios greater than 8.0; and such may be formed without the need for expensive calcination steps, as shown by the examples hereinafter.

In addition, the instant catalyst can be effectively used in an FCC (fluid catalytic cracking) process wherein a carbon-hydrogen fragmentation compound (CHFC) is employed in admixture with the crude oil feed. Such a process will be referred to herein as an FCC-CHFC process.

The term "carbon-hydrogen fragmentation compound(s)" is employed herein to mean materials comprising a lesser number of carbon atoms than found in materials within the gasoline boiling range, preferably those materials containing 5 or less carbon atoms, that fit into any of the categories of:

(a) Hydrogen-rich molecules, i.e., molecules with wt. % hydrogen ranging from about 13.0–25.0 wt. %. This may include light paraffins, i.e. $CH_4$, $C_2H_6$, $C_3H_8$ and other materials.

(b) a molecule whose chemical structure permits or favors the transfer of carbon-hydrogen fragments. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(c) Secondary Reaction Products from materials in categories (a) or (b) above that are carbon-hydrogen fragmentation compounds themselves, or transfer hydrogen. This includes olefins, naphthenes, or paraffins.

(d) Classes of materials which are structurally or chemically equivalent to those of category (c), notably olefins, etc.; and (e) A combination of any or all of the materials in categories (a) through (d).

The preferred carbon-hydrogen fragmentation compounds are methanol, dimethyl ether and $C_2$–$C_5$ olefins, with methanol and dimethyl ether being the most preferred.

The term "crude oil feed" is used herein for the FCC-CHFC process and otherwise to denominate any full range crude oil from primary, secondary or tertiary recovery from conventional or offshore oil fields and feedstocks derived from crude oils. "Crude oil feeds" may include any full range "syncrude" such as those that can be derived from coal, shale oil, tar sands and bitumens. The crude may be virgin (straight run) or generated synthetically by blending. It is generally desirable, however, to first desalt the crude since sodium chloride is known to be a poison for most cracking operations. Further the term crude oil derived feed is meant to include component parts of the crude which are generally employed as catalytic cracking feeds or potential feeds therefor and include: feeds such as distillate gas oils, heavy vacuum gas oils, atmospheric and vacuum resids, syncrudes (from shale oil, tar sands, coal), feed derived from hyrocrackers, hydrotreaters, cokers, pyrolysis processes and high boiling FCC product recycle fractions; and fractions boiling above the traditional end of the gasoline boiling range which generally includes compounds containing greater than about eleven carbon atoms and combinations thereof.

Further, the FCC-CHFC process is believed to involve combination reactions which are believed to be effective, at least in part, in removing sulfur, oxygen, nitrogen and metal contaminants found in a whole crude or a heavy hydrocarbon portion thereof.

The operation of an FCC-CHFC type process is generally carried out at temperatures within the range of 400° F. up to about 1400° F. and more usually within the range of 700° F. to about 1200° F. at pressures selected from within the range of below atmospheric up to several hundred pounds per square inch gauge (psig) but normally less than 200 psig. Preferred conditions include a temperature within the range of about 800° F. to about 1150° F. and pressures within the range of atmospheric to about 100 psig and higher.

The carbon-hydrogen fragmentation compound may be provided to the process in most any way so long as it is present when contact with the catalyst material is effected, i.e., in situ generation is suitable.

In one embodiment of the invention, an FCC-CHFC process, methanol is used in combination with a gas oil type of hydrocarbon charge stock. The weight percent of methanol in the hydrocarbon charge passed to the cracking or conversion operation will vary considerably and may be selected from within the range of between about 1% and about 25 percent by weight, it being preferred to maintain the ratio within the range between about 5% and about 20%, based on the weight of the feed. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

The FCC-CHFC process preferably employs a fluidized catalyst system at low pressures without the need for high pressure hydrogen gas. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles and act to minimize problems due to diffusion/mass transport limitations and/or heat transfer.

The FCC-CHFC process can make use of the relatively cheap carbon-hydrogen fragmentation compounds readily available in petroleum refineries, such as light gas fractions, light olefins, low boiling liquid streams, etc., and, in particular, can employ methanol, a product which is readily available in quantity, either as a transportable product from overseas natural gas conversion processes, or may be available as as a product from large scale coal, shale, or tar sand gasification. It also can utilize carbon monoxide (in combination with contributors such as water or methanol), which gas is readily available from refinery regeneration flue gas (or other incomplete combustion processes), or from coil, shale, or tar sand gasification. Highly efficient recycle of carbon-hydrogen fragmentation compounds can also be effected.

The following examples were carried out to illustrate the instant invention and are not intended to be limiting thereof.

EXAMPLES 1 TO 4

Examples 1 to 4 are examples employing Reference Zeolites Y, RE-Y, LZ-210 and a zeolite of this invention LZ-210-RE. The prefix or suffix "RE" is employed herein to denominate ion exchange of a zeolite with at least one rare earth cation. Reference Zeolite Y is a commercially available Y catalyst having a $SiO_2$ to $Al_2O_3$ ratio of 5.0 which has been thermally stabilized by steaming and is the zeolite in Example 1. The rare earth exchanged forms of the zeolite are employed in examples 2 and 4. LZ-210 was prepared according to the procedure of U.S. Ser. No. 315,853 from a Y zeolite having an $SiO_2/Al_2O_3$ ratio of about 5.0 to give an LZ-210 product having an $SiO_2/Al_2O_3$ ratio of about 6.5. Zeolites RE-Y and LZ-210-RE were prepared by ion exchange, with a commercially available rare earth chloride solution from Molycorp, Inc. and sold under Product Code No. 5240. The rare earth analysis of Code No. 5240, expressed as the rare earth (RE) oxides, was:

|  | Weight Percent |
|---|---|
| $CeO_2$ | 10.0 |
| $La_2O_3$ | 60.0 |
| $Nd_2O_3$ | 21.5 |
| $Pr_6O_{11}$ | 7.5 |
| Other $RE_2O_3$ | 1.0 |

The rare earth ion exchange was carried out by preparing a slurry of about 200 grams of anhydrous LZ-210 in one liter of water and about 50 grams of the rare earth chloride solution. Analysis indicated that the rare earth content was about 5 to 6 percent by weight based on the oxide of the total weight. The slurry was refluxed for one hour, filtered and washed with water until essentially free of residual chloride. The resulting product was then dried.

The catalysts of examples 1 to 4 were prepared by employing zeolites Y, RE-Y, LZ-210 and LZ-210-RE and formulating each into a final catalyst by forming zeolite and alumina composites consisting of 15% by weight zeolite and 85% by weight alumina, based on the anhydrous total weight. The composites were formed by mixing the zeolite with about 76% of the alumina component in a Hobart mixer and then adding thereto the remaining alumina in a peptized form. The composite was then extruded to 1/16 inch extrudates, dried at 100° C. and then calcined in dry air to 500° C. The extrudates were then sized (10-12 standard U.S. mesh) and hydrated. The finished catalysts were then heated in a furnace in static air to 650° C. at the rate of 12°-16° C. per minute. The extrudates were then contacted with 100% steam at 650° C. and then raised to 750° C. and held at 750° C. for five hours and then cooled to 200° C. The extrudates were then collected and sized to 60-100 mesh (U.S. Standard).

The catalysts were then evaluated by ASTM test method D-3907 for use as cracking catalysts. Example 4 shows that a catalyst prepared from a rare earth exchanged LZ-210 (LZ-210-RE) had a higher % conversion and higher % gasoline than the zeolites of examples 1 and 2 which were derived from zeolite Y and, similarly, had a higher % conversion and higher % gasoline than the LZ-210 of example 3.

Table I demonstrates the improved activity, as indicated by the % Conversion, and the improved gasoline yield, as indicated by the % Gasoline, of the catalysts of the instant invention as compared to Y zeolites. A comparison of the rare earth exchanged Y zeolite of example 2 (5.41 weight percent rare earth) and the rare earth exchanged LZ-210 of example 4 (5.56 weight percent rare earth) demonstrates the unexpected effect of rare earth cations on LZ-210. Whereas the rare earth Y of example 2 showed a 2.3% conversion increase over the Y zeolite of example 1, the LZ-210-M product of example 4 gave a 3.4% increase in conversion as compared to the conversion obtained with LZ-210. Even more surprising is the increase in % Gasoline Yield for example 4, according to this invention, whereas the similarly treated Y zeolite of example 2 showed substantially the same % Gasoline as the non-rare earth form of zeolite Y of example 1. These results demonstrate the unexpected nature of the combination of LZ-210 and rare earth cations.

TABLE I

| Example[2] | % Conv.[1,3] | % Gasoline[4] | % Gas[4] | % Coke[4] | % $RE_2O_3$[5] | % $Na_2O$[5] |
|---|---|---|---|---|---|---|
| 1 | 68.6 | 51.0 | 12.6 | 5.2 | 0 | 2.25 |
| 2 | 70.9 | 50.9 | 14.9 | 5.1 | 5.41 | 2.06 |
| 3 | 69.8 | 51.5 | 13.6 | 4.9 | 0 | 2.3 |
| 4 | 73.2 | 53.7 | 13.7 | 5.9 | 5.56 | 2.07 |

[1]evaluated by ASTM test method D-3907
[2]examples 1, 2, 3 and 4 are the average value of triplicate determinations
[3]percent conversion by weight, based on converted feed
[4]wt. % Gasoline = $C_5$ hydrocarbons to hydrocarbons boiling below 420° F. in product as weight percent of feed.
wt. % Gas = hydrocarbons boiling below $C_5$ in product as weight percent of feed.
wt. % Coke = residue left on used catalyst after stripping as set forth in ASTM D-3907 as weight percent of feed.
[5]wt. % Rare earth expressed as the oxide where "RE" denotes at least one rare earth cation. % sodium expressed as the oxide ($Na_2O$).

EXAMPLES 5 TO 12

Examples 5 to 12 were carried out to compare LZ-210 and LZ-210-M wherein M is a rare earth cation. Examples 5, 8 and 11 are comparative examples wherein no rare earth exchange was carried out. Examples 6, 7, 9, 10 and 12 include a rare earth exchange carried out as in examples 2 and 4 with the weight percent rare earth oxide based on the total final weight of the rare earth exchanged zeolite being, respectively, 5.77%, 6.19%, 6.15%, 2.27% and 5.8%. Each LZ-210 was prepared from a Y zeolite having a $SiO_2$ to $Al_2O_3$ ratio of about 5.

Each zeolite was formed into a catalyst comprising the zeolite and alumina, extruded and dried to 500° C., as in examples 1 to 4. The extrudates were hydrated and then deactivated by heating in static air to 750° C. at the rate of 12° to 16° C. per minute. The extrudates were then contacted with an air/steam stream containing 23 percent by volume steam and heated to 840° C. and held at this temperature for 17 hours. The initial heating procedure and in situ generated steam and the heating procedure at 840° C. are simulations of the conditions experienced by a cracking catalyst in the stripper and regenerator portions of a commercial cracking unit. The above procedure employed for the instant catalysts and those in the following examples was a deactivation by a hydrothermal treatment to simulate a catalyst which has been employed in catalytic cracking.

The catalysts were then sized to 60/100 mesh (U.S. Standard) and evaluated by ASTM test method D-3907. The results of these tests are shown in Table II. Table II shows the improved yield to gasoline obtained with catalysts containing LZ-210-RE as compared to LZ-210 (hydrogen form) when both have a similar $SiO_2/Al_2O_3$ ratios.

TABLE II

| EXAMPLE | 5 | 6 | 7 | 8 | 9 | 10 | 11 | 12 |
|---|---|---|---|---|---|---|---|---|
| $SiO_2/Al_2O_3$ | 7.4 | 7.4 | 7.9 | 9.1 | 9.1 | 9.1 | 11.0 | 11.0 |
| % Conversion[1] | 72.5 | 71.0 | 71.2 | 66.3 | 73.9 | 71.5 | 71.3 | 71.6 |
| % Gasoline[1] | 51.8 | 54.2 | 51.3 | 49.7 | 54.1 | 51.9 | 50.1 | 51.9 |
| % $RE_2O_3$[2] | 60 | 5.77 | 6.19 | 0 | 6.15 | 2.27 | 0 | 5.8 |

[1]% Conversion and % Gasoline are as defined in Table I.
[2]% Rare earth expressed as the oxide where "RE" denotes at least one rare earth cation.

EXAMPLES 13 TO 16

Four zeolites were compared in examples 13, 14, 15 and 16. The zeolite of example 13 was a Y zeolite having a $SiO_2/Al_2O_3$ ratio of about 5.0. Examples 14, 15 and 16 employ LZ-210 compositions prepared from a Y zeolite having a $SiO_2/Al_2O_3$ ratio of about 5.0 and, respectively, have $SiO_2/Al_2O_3$ ratios of 6.5, 7.0 and 9.0. Each zeolite was rare earth exchanged, as before described, to give a rare earth content (based on rare earth oxide on total anhydrous weight of exchanged zeolite), respectively of 13.6%, 8.9%, 10.7% and 9.9%.

Each zeolite was formulated into a catalyst by use of a silica/alumina matrix with the composite containing a 15 wt. % zeolite and 85 wt. % matrix. The composite was formed into extrudates as described in examples 5 to 12 except that the extrudates were deactivated prior to testing as catalysts by heating the extrudates to 200° C. in nitrogen (about 5 hours), heating the extrudates from 200° C. to 760° C., and then heating at 760° C. in 100% steam for 5 hours. The extrudates were cooled, sized and then tested as above described in examples 5 to 12 by ASTM test method D-3907. The results of these tests are shown in Table III. The results show that under mild deactivation conditions that an LZ-210 having a $SiO_2/Al_2O_3$ ratio of 6.5 provides superior yield to gasoline relative to Y zeolites and LZ-210 zeolites having higher $SiO_2/Al_2O_3$ ratios.

TABLE III

| EXAMPLE[1] | 13 | 14 | 15 | 16 |
|---|---|---|---|---|
| $SiO_2/Al_2O_3$ | 5.0 | 6.5 | 7.0 | 9.0 |
| % Conversion | 69.3 | 72.2 | 68.0 | 65.8 |
| % Gasoline | 51.3 | 52.6 | 50.6 | 50.4 |
| % Coke | 3.6 | 3.2 | 3.2 | 1.9 |
| % $RE_2O_3$[2] | 13.6 | 8.92 | 10.7 | 9.9 |

[1]Conversion, % Gasoline, % Gas and % Coke are as defined in Table I.
[2]% Rare earth expressed as the oxide where "RE" denotes at least one rare earth cation.

The above data of Table III, showing rare earth exchanged zeolites, demonstrate improved coke selectivity, i.e., reduction in coke formation, obtained by use of catalysts containing an LZ-210-M having a $SiO_2$ to $Al_2O_3$ ratio greater than 6.0 where "M" is at least one rare earth cation as above described. Whereas in example 13, zeolite Y, gave a % Coke of 3.6%, LZ-210 ($SiO_2/Al_2O_3$ ratio of 6.5) gave only 3.2% coke, even at an increased conversion. LZ-210 having a $SiO_2$ to $Al_2O_3$ ratio of 9.0 gave a % Coke of only 1.9%. This coke selectivity is a substantial improvement in coke reduction and is not similarly observed in Y zeolite catalysts.

EXAMPLE 17

The zeolites used in formulating the catalysts employed in examples 1 to 16 were chemically analyzed and found to contain the following amounts of $Al_2O_3$, $SiO_2$, $Na_2O$ and $RE_2O_3$ (total rare earth cations expressed as the oxide), as shown in Table IV.

TABLE IV

| Zeolite of Example No. | % $Na_2O$ | % $(NH_4)_2O$ | % $Al_2O_3$ | % $SiO_2$ | % $RE_2O_3$[1] | % Ion Exchange[2] $RE_2O_3$ |
|---|---|---|---|---|---|---|
| 1 | 2.25 | 9.50 | 22.0 | 65.4 | 0 | 0 |
| 2 | 2.06 | 6.19 | 22.2 | 64.1 | 5.41 | 22.7 |
| 3 | 2.3 | 6.2 | 19.1 | 70.0 | 0 | 0 |
| 4 | 2.07 | 4.54 | 18.9 | 68.6 | 5.56 | 27.4 |
| 5 | 1.28 | 6.30 | 17.1 | 74.9 | 0 | 0 |
| 6 | 1.19 | 3.80 | 16.5 | 72.5 | 5.77 | 32.6 |
| 7 | 0.27 | 4.92 | 16.0 | 72.0 | 6.19 | 36.1 |
| 8 | 1.2 | 6.2 | 14.3 | 76.4 | 0 | 0 |
| 9 | 1.07 | 3.75 | 14.7 | 76.7 | 6.15 | 39.0 |
| 10 | 1.22 | 5.26 | 15.4 | 79.5 | 2.27 | 13.8 |
| 11 | 0.39 | 5.1 | 12.3 | 79.5 | 0 | 0 |
| 12 | 0.31 | 2.6 | 11.7 | 78.8 | 5.8 | 46.2 |
| 13 | 2.2 | 2.3 | 20.5 | 63.2 | 13.6 | 61.9 |
| 14 | 1.8 | 2.7 | 17.8 | 68.9 | 8.92 | 46.8 |
| 15 | 1.70 | 2.0 | 17.1 | 70.2 | 10.7 | 58.9 |
| 16 | 0.79 | 1.7 | 13.7 | 74.9 | 9.9 | 67.4 |

[1]Wt. % rare earth expressed as the oxide where "RE" denotes at least one rare earth cation.
[2]Ion Exchange percent of rare earth, expressed at the oxide.

The above chemical results are instructive in characterizing the unique character of the catalysts of this invention. The process for preparing examples 1 to 16 did not involve a $Na_2O$ calcination step as a precedent step for the ammonium or rare earth exchanges. Whereas the Y zeolites employed in examples 1, 2 and 13 had a final $Na_2O$ content of 2 percent or greater, the LZ-210 catalysts show a low $Na_2O$, without any calcination step having been carried out prior to ammonium exchange and/or rare earth cations exchange. It is well recognized in the art of forming cracking catalysts that zeolite Y must be subjected to calcinations of 500° C. or greater prior to ion exchange if a Na₂O content less than 2 percent by weight is to be achieved without the use of a commercially unrealistic and expensive number of ion exchanges. The instant invention provides catalysts having a Na₂O content less than 1.2 percent by weight, based on the weight of the zeolite and such is achieved without first calcining the LZ-210 zeolite, i.e., without a thermal treatment of the zeolite at a temperature above 300° C. prior to one or more ion exchanges, where such thermal treatment is for the purpose of redistributing zeolite cations to provide for an increase in the ease of their removal by ion exchange.

The results in Table IV demonstrate that the catalysts of the instant invention may be prepared without a calcination step as has traditionally been employed for catalysts containing Y zeolites. For example, the catalysts of examples 6, 7, 9 and 16 contain rare earth cations and less than 1.2 percent $Na_2O$, based on the weight of the zeolite, and such catalysts were prepared without the use of calcination steps in their preparation, i.e., a calcination step before an ion exchange step.

EXAMPLES 18 TO 20

Examples 18 to 20 were carried out to evaluate the hydrothermal stability of: (1) an acid washed zeolite Y; (2) an EDTA extracted zeolite Y; and (3) LZ-210 (hydrogen form), respectively. The zeolites were ammonium exchanged to provide zeolites with similar $Na_2O$ contents. The zeolites were not rare each exchanged. Each zeolite was steam deactivated by a procedure similar to that described in examples 5 to 12 except that instead of incrementally heating the zeolites, the zeolites were placed in a hot furnace (873° C.±4° C.) in the presence of 23%±2% by volume steam in air for five hours. The zeolites were then hydrated at room temperature (18° C. to 22° C.) for at least 48 hours. The percent oxygen adsorption capacity retention, percent surface area retention and percent X-ray crystallinity retention (XRD) were measured by the procedure described in U.S. Ser. No. 315,853 for each zeolite. The oxygen capacity, surface area and crystallinity of the zeolites were measured before and after the hydrothermal treatment and the percent oxygen capacity retention, percent surface area retention and percent X-ray retention determined. A higher overall retention, indicates the zeolite would be expected to be more stable towards the hydrothermal conditions found in catalytic cracking processes, and accordingly have a longer catalyst life. The "Average Crystallinity Retention" values in Table V are most significant when compared with the cracking data in Table VI which show that LZ-210 gives a conversion greater than 70 percent and a percent gasoline yield of greater than 50% while having a high average crystallinity retention, and, accordingly, improved catalyst life.

TABLE V

| Example | 18 | 19 | 20 |
|---|---|---|---|
| SiO₂/Al₂O₃: | 8.8 | 8.2 | 8.4 |
| % O₂ Adsorption Capacity Retention: | 49.2 | 26.0 | 47.9 |
| % Surface Area Retention | 45.9 | 19.4 | 46.6 |
| % XRD Crystallinity Retention: | 54.2 | 19.3 | 57.9 |
| Average Crystallinity Retention: | 49.8 | 21.6 | 50.8 |

TABLE V-continued

| Example | 18 | 19 | 20 |
|---|---|---|---|
| % Na₂O | 0.76 | 1.02 | 1.13 |

EXAMPLES 21 TO 23

The zeolites described in examples 18, 19 and 20 were evaluated in examples 21, 22 and 23, respectively, by ASTM D-3907 by preparing catalysts employing the zeolites by the procedure described in examples 5 to 12. Table VI shows that LZ-210 exhibited a high percentage of the products in the gasoline range at a % conversion of 72.8 percent. In contrast, the catalyst in example 21 showed both low activity and gasoline yield while the catalyst in example 22 showed lower gasoline yield even at a higher conversion.

TABLE VI

| Example[1] | 21 | 22 | 23 |
|---|---|---|---|
| SiO₂/Al₂O₃ | 8.8 | 8.1 | 8.4 |
| % Conversion | 65.9 | 74.4 | 72.8 |
| % Gasoline | 47.9 | 51.5 | 51.9 |
| % Gas | 13.0 | 15.6 | 15.4 |
| % Coke | 5.1 | 5.1 | 5.1 |

[1]% Conversion, % Gasoline, % Gas and % Coke are as defined in Table 1.

EXAMPLE 24

Three catalysts (A, B and C) were prepared for evaluation as FCC catalysts and contained the following zeolitic components:

ZEOLITE FOR CATALYST A

Catalyst A is a comparative catalyst containing a calcined rare earth Y zeolite (CREY) and was prepared using a Y denominated zeolite "Y-52" (as described in Zeolite Catalyst Data Sheet F-3840C (7/79) by Union Carbide Corporation, Danbury, CT.) having a SiO₂/Al₂O ratio of about 4.7.

The zeolite employed in Catalyst A was prepared by refluxing Y-52 in a rare earth solution prepared by use of a rare earth chloride solution (Molycorp No. 5240). The product was calcined at 650° C. for about 0.5 hours and ammonium exchanged to give a final calcined, rare earth exchanged Y zeolite (CREY). Chemical analysis of the calcined rare earth Y zeolite gave the following:

| | Weight Percent |
|---|---|
| SiO₂ | 58.50 |
| Al₂O₃ | 20.24 |
| (NH₄)₂O | 3.65 |
| Na₂O | 0.79 |
| RE₂O₃ | 16.89 |

The rare earth exchanged zeolite Y was formed into its final form by mixing such with an inorganic oxide matrix, as hereinafter described.

ZEOLITES FOR CATALYSTS B and C

Catalysts B and C were prepared using LZ-210 zeolites (no Na₂O calcination) having, respectively, SiO₂/Al₂O₃ ratios of 9.0 and 6.5, which were prepared in accordance with the above description and the disclosure of EPC Publication No. 82,111, as above discussed.

The LZ-210 products were ammonium exchanged by the same procedure employed for the zeolite of Catalyst A (CREY), and were rare earth exchanged. The rare earth solutions were prepared using a mixture of rare earth cations sold under the Product Code No. 5240 by Molycorp, Inc., above described.

Catalysts B and C were prepared using a solution containing nine (9) percent by weight rare earth chlorides. The rare earth exchange of the zeolites for Catalysts B and C were carried out similar to that employed for preparation of Catalyst A, except that no $Na_2O$ calcination was employed during preparation. Chemical analyses of the zeolites employed in preparation of Catalysts B and C were as follows:

|  | Catalyst[1] | |
|---|---|---|
|  | B | C |
| $SiO_2$ | 74.5 | 70.2 |
| $Al_2O_3$ | 13.5 | 18.5 |
| $(NH_4)_2O$ | 0.67 | 0.98 |
| $RE_2O_3$ | 8.5 | 8.3 |
| $Na_2O$ | 0.41 | 0.73 |

[1] Chemical analysis of the rare-earth exchanged zeolite, employed in designated catalyst, prior to formulation of the catalyst with an inorganic oxide matrix. "RE" denotes at least one rare earth cation.

FORMULATIONS OF CATALYSTS A, B and C

Catalysts A, B and C were prepared by employing the above described zeolites (16 percent by weight) in the formulation of cracking catalysts. In addition to the above described zeolites, the following materials were employed in preparing each catalyst: a stabilized silica sol containing 40 percent by weight silica in water; pseudoboehmite alumina; and a kaolin clay having the following composition:

| Component | Weight Percent |
|---|---|
| $Al_2O_3$ | 43.2 |
| $SiO_2$ | 53.1 |
| $TiO_2$ | 2.3 |
| $Fe_2O_3$ | 1.1 |
| $Na_2O$ | 0.04 |
| $K_2O$ | 0.19 |

Each catalyst was prepared by the following procedure to form the final cracking catalysts A, B and C. The alumina was peptized by addition of an organic acid in an amount equal to 12 weight percent of the alumina. The kaolin clay was added to this slurry and blended until a homogeneous mixture was observed. A slurry of the selected zeolite was added to the peptized alumina/clay slurry and the resulting mixture blended until homogeneous. The silica source was added to this mixture and blended until homogeneous. This final slurry was adjusted by addition of water to have 25 percent by weight solids. The mixture (gel) was then spray dried under conditions which result in an average particle size of about 75 microns. The catalyst was sized to exclude catalyst particles larger than 150 microns.

EVALUATION FOR CATALYTIC CRACKING

Catalysts A, B and C were evaluated for catalytic cracking using a fixed-fluidized bed pilot unit in which the catalyst performed much as it would in a commercial unit. The operations make up a complete cycle of gas oil cracking, stripping, regeneration and purge. For a full catalyst evaluation at fixed process conditions 10-16 cycles are employed.

The unit temperature, weivght hourly space velocity (WHSV) and the catalyst to oil ratio (C/O) are given in Table VII. The feedstock had an API° gravity of 24.6, an IBP (Initial Boiling Point) of 630° F., FBP (Final Boiling Point) of 1038° F. and a UOP K Factor of 12.0. The UOP K Factor is defined as:

$$K = (T_B)^{\frac{1}{3}}/d$$

where "$T_B$" is the average boiling point in degrees Rankine and "d" is the specific gravity 60°/60° F.

The products from the cracking reaction include hydrocarbons of the types shown below:

| $H_2$ | Hydrogen |
|---|---|
| $C_1$ | Methane |
| $C_2$ | Ethane |
| $C_3$ (Total) | Propane and Propene |
| $C_3=$ | Propene |
| $C_4$ (Total) | Butane, Butene and Isobutane |
| Gasoline | Gasoline in which the hydrocarbons have the necessary molecular weights or structures to boil between 110° F. and 430° F. (43.3° C.-221° C.). |
| LCO | Light Cycle Oil - Hydrocarbons which have molecular weights or structures to boil between 430° F. and 640° F. (221° C.-338° C.). |
| HCO | Heavy Cycle Oil - Any hydrocarbons left having boiling points greater than 640° F. (338° C.). |
| Coke | Hydrocarbons which may have polymerized to coke and/or heavy aromatic hydrocarbons adsorbed by the cracking catalyst and not removed during stripping. |

Catalysts A, B and C were evaluated according to the above procedure and the results are set forth in Table VII. Before evaluation the catalysts were each deactivated in 100% steam at zero psig for 2 hours at 760° C. to simulate the deactivation of cracking catalysts in commercial operation. The rare earth content is given as $RE_2O_3$ wherein "RE" denominates any rare earth cation present as a result of the catalyst preparation.

The pilot unit data in Table VII are consistent with the previous examples according to this invention showing superior gasoline yield and a substantial reduction in coke yield for LZ-210-RE catalysts at comparable conversion levels. Further, catalysts B and C show improved stability over Catalyst A following identical steam deactivation as indicated by the higher activities for catalyst B and C. Catalyst A required an increase in the C/O ratio to obtain comparable wt % conversion under substantially the same evaluation conditions employed for Catalysts B and C.

TABLE VII

|  | CATALYST | | | | | | |
|---|---|---|---|---|---|---|---|
|  | A | | B | | C | | |
| WHSV | 40.5 | 39.7 | 40.0 | 39.8 | 40.0 | 40.0 | 39.9 |
| C/O Ratio | 2.47 | 3.02 | 3.00 | 2.51 | 2.50 | 2.50 | 2.50 |
| Cracking Temp. (°C.) | 505 | 505 | 505 | 505 | 505 | 505 | 505 |
| Wt % Conversion[1] | 69.7 | 73.33 | 73.54 | 71.21 | 70.21 | 72.29 | 72.98 |
| $H_2$ | 0.033 | 0.042 | 0.038 | 0.039 | 0.040 | 0.039 | 0.040 |
| $C_1 + C_2$ | 1.18 | 1.39 | 1.47 | 1.15 | 1.27 | 1.19 | 1.29 |
| $C_3=$ | 3.45 | 3.81 | 3.70 | 3.70 | 3.62 | 3.50 | 3.65 |
| Total $C_3$ | 4.57 | 5.06 | 5.06 | 4.64 | 4.58 | 4.56 | 4.86 |
| Total $C_4$ | 8.86 | 9.37 | 9.22 | 8.65 | 7.39 | 7.66 | 8.72 |
| Gasoline yield[1] | 51.19 | 53.04 | 52.95 | 53.27 | 53.36 | 55.00 | 53.96 |
| LCO[1] | 20.70 | 18.17 | 17.98 | 18.47 | 19.96 | 18.92 | 17.87 |
| HCO[1] | 9.60 | 8.50 | 8.48 | 10.32 | 9.83 | 9.79 | 9.15 |
| Coke[1] | 3.87 | 4.43 | 4.80 | 3.46 | 3.57 | 3.84 | 4.11 |

TABLE VII-continued

| | CATALYST | | | | | | |
|---|---|---|---|---|---|---|---|
| | A | | | B | | C | |
| Chemical Analysis:[2] | | | | | | | |
| Wt. % Na₂O | 0.21 | 0.21 | 0.21 | 0.13 | 0.13 | 0.19 | 0.19 |
| Wt. % SiO₂ | 46.6 | 46.6 | 46.6 | 50.3 | 50.3 | 48.7 | 48.7 |
| Wt. % Al₂O₃ | 48.2 | 48.2 | 48.2 | 46.9 | 46.9 | 46.9 | 46.9 |
| Wt. % RE₂O₃ | 2.38 | 2.38 | 2.38 | 1.35 | 1.35 | 1.61 | 1.61 |

[1] Weight Percent Conversion of the feedstock to products as defined in ASTM D3907. Gasoline Yield, LCO, HCO and Coke expressed as a weight percent of feed converted.
[2] Chemical analyses, expressed at the weight percent, of finished catalyst after evaluation in pilot unit.

EXAMPLE 25

A catalyst was prepared to demonstrate the use of catalysts containing rare earth forms of Y zeolites and rare earth forms of LZ-210 according to this invention. A catalyst was prepared using 7.5 percent by weight of a CREY, based on the total catalyst weight, employed in preparing Catalyst A in example 24 and 17.5 weight percent, based on the total catalyst, of an LZ-210 zeolite having a SiO₂/Al₂O₃ ratio of 9.0 and having 9.0 weight percent rare earth, expressed as the oxide (RE₂O₃).

The catalyst was prepared by forming an aqueous mixture containing 25 weight percent solids and containing:

| | Weight Percent[1] |
|---|---|
| CREY | 7.50 |
| LZ-210 | 17.50 |
| Alumina[2] | 20.00 |
| Silica[3] | 5.00 |
| Kaolin Clay | 50.00 |

[1] Weight percent based on total weight of solids (water excluded)
[2] Pseudoboehmite alumina
[3] Stabilized silica sol The catalysts was prepared according to the procedures employed for Catalysts A, B and C of example 24.

The catalyst was evaluated for catalytic cracking according to ASTM test method D-3907, except that the feedstock had 700 ppm total nitrogen, API gravity of 24.8°, IBP (Initial Boiling Point) of 354° F., FBP (Final Boiling Point) of 1077° F. and a UOP K Factor of 11.8.

The catalyst was treated at 843° C. in 100% steam for 2 hours to simulate deactivation similar to that found in commercial cracking processes. The % Conversion, % Gasoline Selectivity, and % Coke were as follows.

TABLE VIII

| wt. % Conversion[1] | wt. % Gasoline Selectivity[2] | wt. % Coke[1] |
|---|---|---|
| 71.1 | 69.7 | 1.34 |

[1] As defined in Table I

[2] % Gasoline Selectivity = $\left( \dfrac{\% \text{ Gasoline Yield}}{\text{wt \% Conversion}} \right)$

EXAMPLE 26

An FCC-CHFC process is carried out using a crude oil feed comprising a heavy vacuum gas oil in a cracking operation. The vacuum gas oil is characterized by the API gravity (60° F.) of 20.70, an average molecular weight of about 400±10 and a boiling range between about 700° F. and about 1100° F. The carbon-hydrogen fragmentation compound is methanol and is present in an amount of 10 percent by weight. The catalyst is a LZ-210-M (SiO₂/Al₂O₃ of 6.8) and is evaluated in a riser FCC unit after heating the catalyst to about 1000° F.±20° F. The hydrocarbon products show improved selectivity to motor fuel (hydrocarbon) products by addition of methanol.

What is claimed is:

1. The process for the preparation of a cracking catalyst comprising the treatment of a zeolitic aluminosilicate which has a mole ratio of oxides in the dehydrated state of (0.85–1.1) M$_{2/n}$O:Al₂O₃; xSiO₂ wherein M is a cation having a valence of "n" and "x" has a value greater than 6.0; has an x-ray powder diffraction pattern having at least the d-spacings of Table A and having extraneous silicon atoms in the crystal lattice in the form of framework SiO₄ tetrahedra by employing at least one of the following steps of:
  (i) treating the aluminosilicate at an effective temperature for an effective time;
  (ii) providing an effective amount of at least one multivalent cation selected from the class consisting of cerium, lanthanum, praseodymium, neodymium, promethium, samarium, europium, gadolinium, terbium, dysprosium, holmium, erbium, thulium, ytterbium, lutetium and mixtures thereof; with the proviso that steps (i) and (ii) can be carried out for one or more times in any order.

2. The process of claim 1 wherein the aluminosilicate is ammonium exchanged one or more times.

3. The process of claim 1 wherein step (i) is employed.

4. The process of claim 1 wherein step (ii) is employed.

5. The process of claim 1 wherein steps (i) and (ii) are employed.

6. The process according to claim 1 wherein "x" has a value greater than 8.0.

7. The process of claim 1 wherein the aluminosilicate is heated at an effective temperature and for an effective time in the presence of steam.

8. The process of claim 7 wherein the effective time is greater than 0.1 hour.

9. The process of claim 8 wherein the effective time is between 0.1 hour and about 10 hours.

10. The process of claim 1 wherein the zeolitic aluminosilicate is ion exchanged with at least one multivalent cation in an amount of between 16 ion exchange percent and 90 ion exchange percent.

11. The process of claim 1 wherein the step (ii) is employed and the multivalent cation is selected from the group consisting of cerium, lanthanium, praseodymium, neodymium, promethium, samarium, europium, gadolinium, terbium, dysprosium, holmium, erbium, thulium, ytterbium, lutetium and mixtures thereof.

12. The process of claim 1 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein $$\dfrac{b + (N - \Delta z)}{a - N}$$

has a value greater than 6 and the change in defect structure factor $\Delta z$ is less than 0.08; an increased silicon content in the framework, $(N-\Delta z)/N$, of at least 0.5; $a+b+z=1$; $(a-N)+[b+(N-\Delta z)]+z=1$; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

13. The catalyst prepared by the process of claim 1.

14. The catalyst prepared by the process of claim 2.

15. A cracking catalyst comprising: (1) an effective amount of a zeolitic aluminosilicate having a mole ratio of oxides in the dehydrated state of $$(0.85-1.1)\, M_{2/n}O:Al_2O_3:xSiO_2$$

wherein M is a cation having a valence of "n" and "x" has a value greater than 6.0; has an x-ray powder diffraction pattern having at least the d-spacings of Table A; has extraneous silicon atoms in the crystal lattice in the form of framework $SiO_4$ tetrahedra; wherein said zeolitic aluminosilicate has at least 2 ion exchange percent of the cations selected from the group consisting of cerium, lanthanum, praseodymium, neodymium, promethium, samarium, europium, gadolinium, terbium, dysprosium, holmium, erbium, thulium, ytterbium, lutetium and mixtures thereof; (2) and at least one inorganic oxide matrix component.

16. The cracking catalyst of claim 15 wherein the value of "x" is greater than 6.0 and less than 8.0.

17. The cracking catalyst of claim 15 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein $$\frac{b+(N-\Delta z)}{a-N}$$

has a value greater than 6.0 and the change in defect structure factor $\Delta z$ is less than 0.08; an increased silicon content in the framework, $(N-\Delta z)/N$, of at least 0.5; $a+b+z=1$; $(a-N)+[b+(N-\Delta z)]+z=1$; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

18. The cracking catalyst of claim 17 wherein the change in defect structure factor $\Delta z$ is less than 0.05.

19. The cracking catalyst of claim 17 wherein $$\frac{b+(N-\Delta z)}{a-N}$$

has a value greater than 6.0 and less than 8.0.

20. The catalyst of claim 15 wherein said zeolitic aluminosilicate contains between about 5 and about 80 ion exchange percent of a multivalent cation selected from the group consisting of cerium, lanthanum, praseodymium, neodymium, promethium, samarium, europium, gadolinium, terbium, dysprosium, holmium, erbium, thulium, ytterbium, lutetium and having less than 1.2 percent by weight $Na_2O$, based on the weight of said zeolitic aluminosilicate; wherein said zeolitic aluminosilicate has not been calcined.

21. The catalyst of claim 20 wherein said zeolitic aluminosilicate has less than 0.8 percent by weight $Na_2O$ based on the weight of the zeolitic aluminosilicate.

* * * * *